(12) United States Patent
Nista et al.

(10) Patent No.: US 8,495,003 B2
(45) Date of Patent: Jul. 23, 2013

(54) SYSTEM AND METHOD FOR SCORING STREAM DATA

(75) Inventors: James Nista, Long Beach, CA (US); Javed Wahid, Buena Park, CA (US)

(73) Assignee: NHAK, Inc., Long Beach, CA (US)

( * ) Notice: Subject to any disclaimer, the term of this patent is extended or adjusted under 35 U.S.C. 154(b) by 535 days.

(21) Appl. No.: 12/795,877

(22) Filed: Jun. 8, 2010

(65) Prior Publication Data

US 2011/0302123 A1   Dec. 8, 2011

(51) Int. Cl.
*G06F 15/00* (2006.01)
*G06F 15/18* (2006.01)

(52) U.S. Cl.
USPC .......................................................... 706/62

(58) Field of Classification Search
USPC .......................................................... 706/62
See application file for complete search history.

(56) References Cited

U.S. PATENT DOCUMENTS

| | | | |
|---|---|---|---|
| 5,619,648 A | 4/1997 | Canale et al. | |
| 5,796,948 A | 8/1998 | Cohen | |
| 7,072,883 B2 * | 7/2006 | Potok et al. ............................ | 1/1 |
| 2001/0033297 A1 * | 10/2001 | Shastri et al. ................ | 345/741 |
| 2002/0116629 A1 | 8/2002 | Bantz et al. | |
| 2006/0242139 A1 | 10/2006 | Butterfield et al. | |
| 2008/0010126 A1 | 1/2008 | Gunshor et al. | |
| 2008/0010138 A1 | 1/2008 | Gunshor et al. | |

OTHER PUBLICATIONS

K. Cheung Sia et al., "Efficient Monitoring Algorithm for Fast News Alerts", Knowledge and Data Engineering, IEEE Trans. on, vol. 19, No. 7, Jul. 2007.*
L. L Ma et al., "An Adaptive System for Online Document Filtering", Systems, Man and Cybernetics, IEEE International Conference on, pp. 4712-4217, 2003.*
M. Hammami et al., "WebGuard: A Web Filtering Engine Combining Textual, Structural, and Visual Content-Based Analysis", Knowledge and Data Engineering, IEEE Trans. on, vol. 18, No. 2, Feb. 2006.*

* cited by examiner

*Primary Examiner* — Kakali Chaki
*Assistant Examiner* — Vincent Gonzales
(74) *Attorney, Agent, or Firm* — Tutunjian & Bitetto, P.C.

(57) ABSTRACT

A feed combine is provided which receives a feed including content from at least one data source. One of a plurality of scoring methods is selected for scoring the content in the feed based on a velocity of the feed. A determination is made as to which content in the feed is appropriate for display by producing a score using the selected scoring method. The scoring method uses a plurality of weighted scoring factors which alter the score based on whether the content includes objectionable material determined in accordance with user-defined criteria. A determination is made as to whether content is to be rendered on at least one rendering device based on a score assigned to the content.

21 Claims, 4 Drawing Sheets

SYSTEM AND METHOD FOR SCORING STREAM DATA

BACKGROUND

1. Technical Field

The present invention relates to selectively outputting portions of data, and more particularly to a system and method for a feed combine which selectively chooses data source content to be output to a user interface based on scoring criteria.

2. Description of the Related Art

Conventional systems provide a number of different ways to sort through a collection of data and determine which data should be output to a user. However, there is a need for a system which is capable of making accurate determinations as to whether certain data (e.g., textual data, audio data, video data, image data, etc.) should be rendered to an audience.

For example, a business or restaurant owner may which to display content to customers or patrons, whether that content is text-based streams (e.g., originating from social networking sites), video streams, audio streams, etc. However, there are number of problems associated with displaying such content. For example, the owner may wish to prevent certain content from being displayed to avoid offending some or all of his customers.

Another problem relates to the fact that the amount of content which needs to be analyzed can vary greatly. This causes a problem because a particular scheme for filtering or scoring incoming content may work particularly well when the amount of content in a stream is minimal, but may be unsatisfactory when the amount of incoming content greatly increases, or vice versa.

SUMMARY

In light of the foregoing deficiencies of the prior art, it would be advantageous to provide a means for filtering incoming content and to provide the owner with a means for selecting the criteria which is to be filtered. In addition, it would be advantageous to provide a means for altering the filtering and scoring of messages depending upon the amount of incoming content.

In accordance with the present principles, a method is provided which receives a feed including content from at least one data source. One of a plurality of scoring methods is selected for scoring the content in the feed based on a velocity of the feed. A determination is made as to which content in the feed is appropriate for display by producing a score using the selected scoring method. The scoring method uses a plurality of weighted scoring factors which alter the score based on whether the content includes objectionable material determined in accordance with user-defined criteria. A determination is made as to whether content is to be rendered on at least one rendering device based on a score assigned to the content.

In accordance with the present principles, a system is provided which includes a feed combine module configured to produce a feed which includes content from at least one data source. An auger module is configured to select a scoring method for scoring the content in the feed based on a velocity of the feed, and further configured to determine which content in the feed is appropriate for display by producing a score in accordance with the selected scoring method. The scoring method uses a plurality of weighted scoring factors which alter the score based on whether the content includes objectionable material determined in accordance with user-defined criteria. A transmitter module is configured to prioritize the content to determine an order in which the content will be rendered on at least one rendering device based on the scores assigned to the content.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a feed combine application is provided which can sift through a large collection of data in a variety of formats and prepare selected portions of the data for output to a user interface after the data has been filtered and scored. The feed combine application operates in a similar fashion to a combine harvester used for harvesting grain crops by synchronizing several different functions to produce a desired output.

In one particularly useful embodiment, the feed combine comprises a series of integrated functions (e.g., seven functions) which serve to gather, combine, filter, store, score, prioritize and render a collection of content. First, a harvester gathers data from a plurality of data sources. A feed combine conforms the data into a format for processing and forwards the data to a sieve which determines whether the data comprises new data and whether the data satisfies certain criteria. Some of the data is stored in a bin depending upon the determinations made at the sieve. The data stored in the bin is then read in by the auger which scores the data based on certain factors. A transmitter uses the scoring information to determine the quality and priority of the different data messages stored in the bin. The data is then rendered (e.g., loaded for display to a user interface, loaded on a television screen for viewing, output through a speaker, etc.) based on the quality and priority assigned to the data by the transmitter.

Upon reading this description, it will be apparent to those skilled in the art that the feed combine application described herein has many advantageous uses and can be applied in a wide variety of applications or circumstances. For example, in one particularly useful embodiment, the present principles may be applied to filter streams from social networking sites such as Twitter™, Facebook™ and Flickr™ and to ensure that messages from these sites are only displayed if they meet public or private standards of quality and decency. Moreover, a mechanism may be provided which allows a user to uniquely tailor or adjust these standards depending upon user preference.

For example, during a sporting or other live event, social networking sites offer an incredibly unique "stream of consciousness" style of commentary. These live observations from around the world provide a kind of "color commentary" during a game or event. However, trouble may arise when these messages are "off-color" or when they would be deemed rude, offensive or obscene.

To address these issues, the present principles can be applied to filter hundreds, or even thousands, of messages and ensure that only "clean" messages are displayed. Moreover, the feed combine application can score the messages to ensure that only the best messages will be displayed, or to ensure that the best messages will be displayed first. The result is a user generated content stream that is both interesting and relevant, and safe for public viewing.

While the above example applies the present principles in terms of manipulating text-based data, upon reviewing this disclosure it will be apparent to those skilled in the art that the principles described herein are applicable for manipulating any type of data (e.g., audio data, image data, video data, etc.).

Embodiments described herein may be entirely hardware, entirely software or including both hardware and software elements. Moreover, the use of the terms "system" and "module" generally refer to an embodiment which combines software and hardware aspects. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
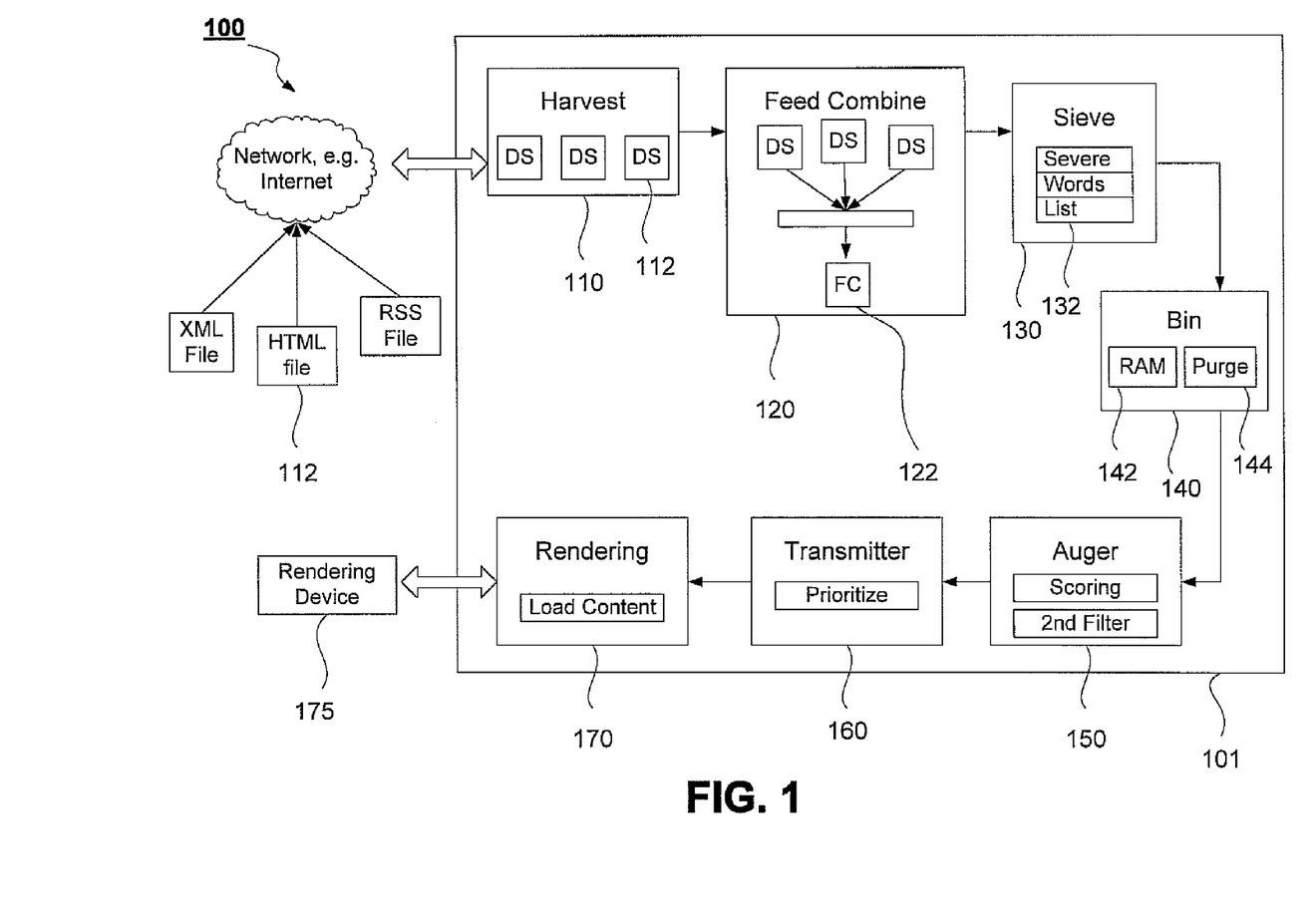
FIG. 1 is a schematic illustrating a feed combine application in accordance with one embodiment of the present principles.

Referring now to the drawings in which like numerals represent the same or similar elements and initially to FIG. 1, a schematic 100 is provided which discloses one embodiment of a feed combine application 101 in accordance with the present principles. As shown illustratively, a feed combine application 101 includes seven modules: harvest module 110, feed combine module 120, sieve module 130, bin module 140, auger module 150, transmitter module 160 and rendering module 170. The application may be coupled to a network (e.g., the Internet) and a rendering device 175. Although FIG. 1 discloses an embodiment of a feed combine application 101 which comprises seven modules, it should be understood that alternate embodiments of the feed combine application 101 may omit certain modules shown in this figure, may combine the functions provided by the different modules, or may include additional modules not shown.

The harvest module 110 gathers and stores a variety of different data sources 112 (represented by "DS" in FIG. 1). The data sources 112 may represent files, data streams, databases, etc. that include information which is to be processed by the feed combine application 101. Moreover, these data sources 112 may include various different types of data (e.g., text data, image data, audio data, video data, etc.). In a particularly useful embodiment, the gathered data sources 112 may comprise data streams primarily comprising text-based messages from social networking sites such as, e.g. Twitter™, Facebook™ and Flickr™ as described above. The data sources 112 may be comprised of a plurality of different file formats (e.g., RSS, XML, HTML, etc.) or data stream formats.

The gathering of the data sources may be accomplished in several different manners. In one embodiment, the harvest module 110 searches for data sources 112 and stores any data sources 112 that are found. The search for data sources 112 may include searching a network, such as the Internet, or may be directed to a specific location (e.g., a particular computer or a particular directory in a computer). In another embodiment, the data sources 112 may be identified by a user (e.g., where a user identifies particular data streams or identifies particular files that are to be processed). Regardless of how the data sources 112 are gathered, the harvest module 110 forwards the data sources to the feed combine module 120 for further processing.

Upon reception of the data sources 112, feed combine module 120 conforms the content of the data sources 112 into a uniform format, hereinafter referred to as the "feed combine format". Conversion of the data sources 112 into a single format allows the feed combine application 101 to process the information uniformly without having to tailor processing to each specific file format. The process of converting the data sources 112 into a single, standard format may involve applying a XML style sheet to the information included in the data sources 112. For example, an XML style sheet can be uniquely defined for each of a variety of different file formats that would permit the information in each file format to be converted into the feed combine format. Likewise, an XML style sheet can be applied to a data stream to convert the information in a data stream into the feed combine format.

The conversion of the data sources 112 into the feed combine format may involve converting each data stream or file into a separate file or data stream. However, in a particularly useful embodiment, all of the data sources 112 are combined into a single file or stream as illustrated in FIG. 1 (hereinafter referred to as "the feed" or the "information feed"). In this case, where all of the data sources are combined into a single feed 122, the content of the data sources 112, or the data sources 112 themselves, may be separated by delimiters or other means to determine where one message or source ends and another begins.

After the data sources 112 have been converted to the feed combine format (represented by "FC" in FIG. 1), the sieve module 130 serves to filter the data sources 112. First, sieve module 130 checks whether the messages or data inputted by the data sources 112 relates to new content (e.g., whether the messages have been previously processed by the feed combine application). This determination will be used by the bin module 140 later down the line in deciding which content should be stored for further processing. Only content which comprises new information will be stored.

If it is determined that a data source 112 includes new content, the sieve module 130 further serves to filter the content of the feed 122 by comparing the content of the feed 122 against certain criteria. In one particular embodiment, the sieve module 130 compares the content in the feed 122 against a "severe words list" 132. The severe words list 123 may be a file, database, list, etc. which includes a catalog of highly sensitive words, data, phrases, names or entries. Thus, comparing content in the feed 122 to the severe words list 132 essentially involves checking whether the content in the feed 122 includes one or more of the sensitive words or entries included in the severe words list 132. In one embodiment, users are provided with an interface which allows them to add words, entries or data to the severe words list 132.

If it is determined that data in the feed 122 includes an entry in the severe words list 132, the sieve module 130 will "tag" the particular piece of content or data including the entry for deletion. The tagging of content 112 can be accomplished in a several different ways. For example, it may be accomplished by directly marking the content with an identifier, or marking an entry in a database which is associated with the content. Content which has been tagged by the sieve module 132 represents a non-conforming piece of data which is not to be rendered by the rendering device 175. The tagging of content in the feed 122 will prevent the content from being stored by the bin module 140, thus preventing the data from being processed further down the line.

To give an example, a particular business may not wish to have its name rendered by a rendering device 175. Thus, an entry can be defined in the severe words list 132 which includes the business name. This will allow the sieve module 130 to identify and tag any data in the feed 122 which includes the business name. Later on, when the bin module 140 is determining which content should be stored for further processing, the entry which was tagged will not be stored and thus will not be processed.

In one embodiment, sieve module 130 is implemented in software code by a loop which reads in one message or piece of content at a time from a file or stream and determines whether the content should be stored. For example, the pseudocode set forth below may represent one implementation of the sieve module 130:

```
$inc = 0;
$x = numberOfMessages;
$messages[array] = getAllMessages;
while ($inc < $x) {
    if (checkNewContent ($messages[$inc]) == TRUE) {
        if (compareAgainstSevereWords($messages[$inc]) == TRUE) {
            sendToBinModuleForStorage($messages[$inc]);
        }
    }
    $inc++;
}
```

The filtering at sieve module 130 does not have to be performed by comparing the information in the data sources 112 and/or the feed 122 to a severe words list 132. Rather, the filtering may performed in a variety of different ways. Moreover, the filtering at the sieve module 130 may involve checking for data other than text (e.g., audio data, image data, video data, etc.), or determining whether a data source 112 meets certain criteria (e.g., determining whether the information in the data source 112 includes an appropriate regional encoding).

For example, the filtering at the sieve module 130 may involve analyzing audio data with audio/voice recognition software to identify and filter out voices associated with particular individuals or sounds originating from a particular source. As another example, sieve module 130 may configured to examine audio content and filter out sounds in a particular range of frequencies, or which have a particular pitch.

In an even further embodiment, the filtering at the sieve module 130 may involve filtering video data. For example, video data may be filtered based on a rating associated with the video data which may or may not be included with the video data (e.g., filter all video data with an "adult" rating). Likewise, sieve module 130 may be configured to filter video data by filtering commercials out of a stream which includes a video or television program.

The bin module 140 includes some type of buffer or computer storage device 142, e.g., RAM, ROM, PROM, etc., for storing the data which is deemed to be new content. Bin module 140 may also include a purge function 144 which serves to delete the used records stored in the bin at predetermined intervals. For example, the purge function 144 may be configured to delete the content in the bin at pre-determined intervals (e.g., every 120 seconds) which has already been sent to the auger module 150, which has already been rendered or which has been tagged for deletion.

The content or records stored by bin module 140 are read in by the auger module 150 which scores the content using certain scoring factors, and tags certain content for deletion. The manner in which scoring is performed by auger module 150 can be done in a variety of different ways using a variety of different factors. In one embodiment, the manner in which content is scored is dependent upon the velocity of the feed (e.g., the number of messages coming through the feed during a particular time interval) or the level of traffic in the feed. The example below illustrates how the process of scoring data may differ depending upon the feed velocity.

Consider the fact that during a popular live event, thousands of messages can be authored (e.g., on Twitter™ or other social networking sites) every minute which are commenting on the event. It would be impractical to output every such message to a rendering device 175 since no one would be able to read that many messages in real-time. Therefore, a predetermined threshold value may be defined for the combined feed 122, or for each data source 112, which represents the maximum velocity or the maximum number of messages that end users can perceive during a predetermined time interval (e.g., it may be determined that a user watching a display can only read ten messages per minute). By comparing the velocity of the feed to the threshold value, an appropriate scoring and/or filtering process can be selected.

For example, in one embodiment, if it is determined that the feed velocity or level of traffic in the feed is at or below the velocity threshold, a "low-velocity" scoring process can be applied to score each piece of content in the feed 122 comprehensively and thoroughly using a detailed analysis. On the other hand, if it is determined that the feed velocity during a predetermined time period exceeds the threshold value, a second "high velocity" scoring process which is less detailed may be employed to allow the system to process content more quickly and filter content at a much higher rate (e.g., filter any content includes even a single negative factor).

For example, if the presence of a particular negative factor is detected in a piece of content during the "low velocity"

scoring process, the detection of the negative factor may negatively impact the scoring of the content but the content would not automatically be marked for deletion and the scoring process would continue. However, if that same negative factor was detected during the "high velocity" scoring process, that factor may serve to automatically mark a piece of content for deletion.

Regardless of whether the low velocity or high velocity scoring process is selected for scoring content in the feed 122, the scoring performed by auger module 150 may involve the application of some function, formula or algorithm which allows for a number of factors to be incorporated into the scoring process each of which may be weighted differently. A particularly useful function for scoring text data is disclosed below. After a score has been assigned to a piece of content in the feed 122, the score may be compared against a threshold value which represents the minimum quality a piece of content must reflect if that piece of content is to be rendered by rendering device 175. Thus, content which does not meet minimum quality requirements is tagged as unavailable and may be deleted by purge function 144. Alternatively, the content which satisfies the minimum quality requirements may be rendered.

Content which is not marked for deletion by the auger module 150 is forwarded to the transmitter module 160 where the quality and priority of the content is determined. The determination of the quality and priority of the content may be based on an analysis of the score assigned to the content by the auger module 150 and/or based on the velocity of the incoming content. In one embodiment, pieces of content having the best scores are to be loaded by the rendering module 170 to be rendered first. In another embodiment, content is rendered in the order in which it is received by the transmitter module 160.

The transmitter module 160 may tag the content which is to be output for display as being either "available" or "unavailable." Content tagged as unavailable will be ignored when the rendering module 170 is determining which content should be loaded to rendering device 175. On the other hand, tagging content as "available" will cause the rendering module 170 to later load the content to the at least one rendering device 175. After the appropriate data has been tagged as available and loaded by the rendering module 170, the transmitter module 160 may also retroactively tag all content which is not being output as being "unavailable".

The decision of which content is to be loaded by the rendering module 170 to rendering device(s) 175 can be made in a variety of ways. In one embodiment, all messages received by the transmitter module 160 are loaded by rendering module 170. However, the order in which content is displayed is based on the priority assigned by the transmitter module 160, where the content with the best scores are given the highest priority. In another embodiment, only a predetermined number of content messages having the best scores are loaded by the rendering module 170 (e.g., only the top ten pieces of content with the highest scores are rendered). Alternatively, all content having a score above or below a predetermined threshold score are loaded by rendering module 170. For example, all content that has a score below 100 is to be rendered (e.g., displayed on a screen, outputted via a speaker, etc.). In an even further embodiment, the rendering module 170 may be configured to only load content which has not been tagged as unavailable by the preceding processing steps (e.g., content which may have been tagged by the sieve module 130, auger module 150 or the transmitter module 160, etc.).

Regardless of the method that is applied to ascertain which content is to be loaded, the rendering module 170 renders all content to at least one rendering device 175. The rendering device(s) 175 may represent a television, cell phone, screen, audio speaker, computer, or any other device which can render textual, audio or video data. Moreover, rendering device 175 may be connected to a server through a network (e.g., the Internet) which receives the results of the feed content application 101 which is being executed by the server. In other embodiments, rendering device 175 may represent a device (e.g., a computer) which is running the feed content application 101 locally.

It should be noted that the feed combine application 101 described above may also provide a number of different interfaces which would allow a user to customize the filtering, scoring, prioritizing and/or loading of content. For example, an interface may allow a user to input content which may be used in the filtering, or set conditions used in filtering. This may involve adding entries to the severe words list or other lists described below (e.g., suspect words list, common words list, positive words lists, spam words list, etc.). This may further involve setting conditional criteria, possibly using Boolean expressions or other means, to filter content (e.g., filtering content based on language, amount of words, whether it includes audio or image data, etc.).

An interface may also be provided which would allow a user to customize the scoring process. For example, a user may be permitted to add scoring factors that are to be used in the scoring process and to decide how heavily each factor should be weighted. Additionally, interfaces may be provided which allow a user to determine the order in which content should be displayed, or to determine which content should be loaded by the rendering module 170. Even further, this may involve allowing a user to adjust the threshold values discussed above. For example, a user may be able to adjust the feed velocity threshold value which determines whether a "low velocity" or "high velocity" scoring process should be employed, or the scoring threshold value which reflects the minimum quality level of a piece of content.

Figure 2:
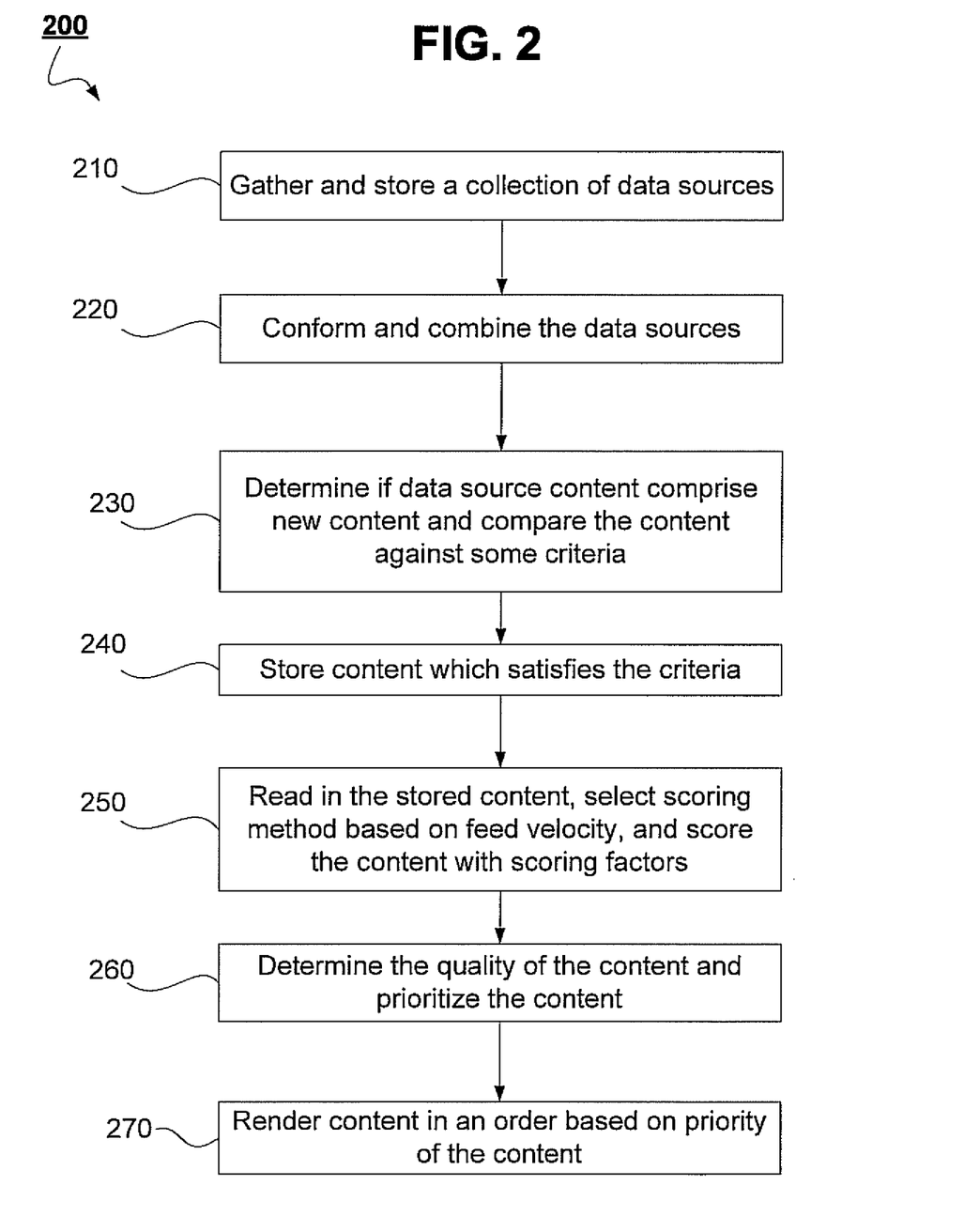
FIG. 2 is a block/flow diagram illustrating an exemplary process for implementing a feed combine application in accordance with one embodiment of the present principles.

Referring to FIG. 2, a block/flow diagram 200 illustrates an exemplary process for implementing a feed combine application 101 in accordance with one embodiment of the present principles. In block 210, a plurality of data sources 112 are gathered and stored (e.g., by the harvest module described with reference to FIG. 1). These data sources may represent data streams, files, databases, etc. and may be relate to a variety of different file or data stream formats. All of the data sources 112 are conformed into the feed combine format (e.g., by the feed combine module 120), and may also be combined into a single feed, data stream or file 122 (block 220).

Next, in block 230, a high-level filter is applied to filter out some of the content provided by the data sources 112. This may be performed by the sieve module 130 described above. In one embodiment, the content may be checked to determine which portions comprise new content or non-repeated content. The determination of which content relates to new content will filter old content from being rendered by a rendering device 175 (e.g., by avoiding storage of old content in block 240).

Block 230 further serves to filter the content by checking the content against some criteria. Only content which complies with the criteria is to be stored in block 240. On the other hand, content which does not comply with the criteria may be tagged as being unavailable for display or tagged for deletion.

In the particular embodiment described above where the present principles are applied to filter and score text messages from social networking sites, the messages from these social networking sites tends quite repetitive for a number of reasons. For example, a message may be repeated because a user sends the same message to multiple users or because other users decided to repeat a message which is found to interesting and compelling. However, seeing a repeated message tends to be annoying to viewers who are watching the message be displayed on a rendering device 175. Thus, in a particularly useful embodiment, the filtering at block 230 may be applied to filter out repetitive messages.

In another useful embodiment, the comparison of the content to the criteria in block 230 may involve comparing the content information against a severe words list 132 as explained above. This comparison may serve as a high-level filter which "separates the nugget from the chaff" by ascertaining which pieces of content include particular words or phrases which will automatically render that content as unavailable for viewing. In other words, while the scoring process performed by the auger module 150 (described below) may allow content to be displayed despite the fact that it includes some negative aspects (e.g., despite the fact that the content may include words which violate the 13+ filter or words represented by inappropriate regional encodings), the filtering performed in block 230 filters out the content which includes criteria (e.g., words or phrases) which should automatically prevent that content from being displayed.

After the filtering has been performed in block 230, content which comprises new data and which satisfies the predetermined criteria is stored in a computer storage medium 142 (e.g., RAM, ROM, PROM, etc.) (block 240). This may be accomplished, e.g., by the bin module 140 described above. The bin module 140 may also include a mechanism to delete content in the storage medium 142 upon a determination that certain pieces of content have already been processed or rendered by a rendering device 175, or because the content has been in the bin for a predetermined length of time.

The content stored in block 240 is then scored using one or more scoring factors in block 250. Scoring may be performed in a number of different ways using a number of different scoring factors. As explained above, the scoring process may vary depending upon the velocity of the feed. In addition, the scoring in block 250 may involve the application of some function which allows for a number of factors to be incorporated into the scoring process each of which may be weighted differently. For example, one particular function is described below which is particularly useful in scoring text data messages.

In addition to scoring content, block 250 may further serve as a secondary filter which tags content for deletion based on the scores assigned to the content. For example, in one embodiment, block 250 may serve to filter content by tagging content for deletion if the content was assigned a score above or below of predetermined threshold.

The scores assigned to content (in block 250) may be used in block 260 to determine the quality of the content and to determine the priority in which the content should be rendered. Other factors may be used in determining the priority and quality of the information (e.g., incoming velocity of the data). The operations in block 260 may also involve tagging content as "available" or "unavailable". These tags or other criteria (e.g., as explained above with respect to rendering module 170 of FIG. 1) may be used in block 270 to determine the content that is to be loaded for display to a rendering device 175.

An example is now provided of how content may be scored (e.g., in block 250). In one particularly useful embodiment where the content in feed 122 primarily includes textual information originating from data streams associated with social networking sites, data in the feed 122 may be scored one piece at a time using the following illustrative function:

$$\text{Score}(datasource) = \left( \frac{20(a) + 15(b) + 15(c) + 12(d) + 7(e) + 5(f) + 3(g) + 1(h)}{NumberOfWords - (a+b+c+d+e+f+g+h+i)} \right) - 5(i)$$

wherein the variables (a)-(i) reflect values relating to the following categories: (a) code and machine data; (b) foreign character sets, regional encodings and/or different languages; (c) sales or spam words; (d) 18+ filter; (e) suspect words; (f) 13+ filter; (g) common words; (h) total number of occurrences of each repeated word; and (i) positive words. It should be noted the above function may employ additional criteria, subsets of the listed criteria or alternate combinations of listed criteria.

Hence, scoring using the above function generally involves comparing the content of the feed 122 against pre-defined criteria in each of the categories (a)-(i). Thus, each of categories (a)-(i) listed above may represent a database or file including a list of pre-defined words or phrases which are searched for within the content, or may represent a general check to determine some criteria (e.g., to determine whether the content is in a particular language).

An example of how the above function can be applied to score content is now provided. Suppose a 1000-word message is read into the auger module 150 from the bin 140. The auger module 150 would check the content to determine whether the content includes any of the words, or satisfies any of the criteria, included in categories (a)-(i) and values representing such information would be plugged into the function above. Preferably, this comparison is performed starting with category (a) and ending with category (i).

Thus, a mechanism would first check whether the content includes any of the words associated with category (a) which represents criteria relating to code and machine data. For example, the value of factor (a) may reflect whether the content includes URLSs or software code (e.g., code in C++, HTML, Java, Pert, PHP, etc.) or may represent the amount of code included in the content. Next, it would be determined whether the content in the data source was either fully or partially set forth in an acceptable language or regional encoding. For example, the value of factor (b) may reflect the number of words that are not included in an appropriate character set, or may represent a weighted value which reflects the percentage of the content that is not in a conforming character set. Moreover, since regional encoding information is not always supplied by a data source provider, computing this factor may also involve analyzing the content against lists of common word in other languages to determine the language of a message.

With respect to category (c), the content may be checked against a list of sale words, advertising words and/or spam words to determine whether the content includes any such words. Thus, the value of factor (c) may represent the number of such matches. For categories (d) and (f), the content may be checked against a list of words or expressions which may be inappropriate for individuals under the ages of 18 and 13, respectively. For example, this may include checking the content for profanity or sexually explicitly content. Thus, the values of these factors may represent the number of such inappropriate entries included in the data source being scored.

Category (e) may represent a particularly useful category in some embodiments. In accordance with category (e), content may be checked to determine whether it comprises any of a plurality of "suspect words" or "suspect entries" (e.g., content which may be proper or improper depending upon the context in which they are used). Upon determining that content in feed 122 includes a suspect word, a further determination may be made as to whether the word is being used in an improper or proper manner. This may involve searching surrounding sentences or paragraphs for other words or phrases which may help to determine the context in which the word is being used.

For example, a restaurant or bar owner may which to display messages originating from social networking sites during a live sporting event which is pertinent to the sporting event. However, the owner may wish to filter negative content from being displayed about a local team (e.g., a New York bar owner may wish to filter negative content about the New York Giants™). Thus, although the word "stinks" would usually be appropriate for display, the owner may choose to filter a message from being displayed if the message stated something like "Giants stink!" in order to avoid offending patrons.

In accordance with the present principles, the owner could add the work "stink" or "stinks" to the suspect words list (e.g., using a web or mobile user interface), and associate a variety of other "clarifying words" or "clarifying phrases" (e.g., Giants™, Jets™, New York, etc.) with the entry in the suspect list in order to determine whether the word "stinks" is being used in an appropriate context for display. Thus, if it was determined that the word "stinks" was used in the same message as "New York", or was included within a predetermined number of words of the phrase "New York", the message would be filtered.

Thus, the value of factor (e) may reflect the number of times a suspect word was determined to be used in an improper context, and/or the level of certainty that these words are being used in a proper context (e.g., where the level of certainty may be reflected by the how many words separate the word "stinks" from the phrase "New York"). The level of certainty that an entry is being used in a proper context may also be reflected by the fact that multiple clarifying words or phrases were found in the same message as the suspect word (e.g., after detecting "stinks" in a message, both "New York" and "Giants" were also detected). Thus, the value of factor (e) may also be affected by the number of clarifying words or phrases found in a particular message.

It should be noted that searching for "suspect entries" does not necessarily involve searching for textual data. Thus, in other embodiments of the present principles, suspect entries are searched for within audio data, video data, image data, etc. For example, in the context of audio data, searching for suspect portions may involve using speech recognition software to search for a suspect speech pattern (e.g., examining audio content to look for a certain suspect word, phrase or sound). If a suspect portion of audio data is detected, the surrounding audio data may then be searched for clarifying portions which would help to determine the context in which the suspect audio portion is being used.

Regarding category (g), the content may be checked to determine whether it includes any of a list of pre-defined common words. For example, consider a message that simply says "Hey You"—both of which are common words. Although this message is not obscene or offensive, it adds nothing to the discourse or "color commentary". Thus, by checking the content for and removing the most common of words from the overall scoring, the system can easily identify content which is rich with ideas and concepts. For example, ascertaining factor (g) may involve reducing the phrase—"They live in a brown house" to "live brown house" for analysis, scoring, phrase matching, and other checks. Thus, the value of factor (g) may represent the level of "content richness" in a message or the lack of content richness in a message.

With respect to category (h), the content of the feed 122 may be checked to determine whether any words are repeated in a particular message. Thus, the value of factor (h) may represent the sum of the total number of occurrences of each repeated word.

Finally, with regard to category (i), the content of feed 122 may be checked against a list of "clean" or "relevant" words to determine whether the content includes words which would have a positive impact on the content being rendered. For example, if feed 122 is being filtered to provide a commentary to fans watching a live football game (e.g., where the New York Giants™ are playing the Philadelphia Eagles™), the feed 122 may be checked for relevant words such as "Giants", "Eagles", "football", etc. In providing a commentary for the game, it is likely that the content including such words would be relevant to the commentary, and thus should increase the probability that the content will be displayed to the fans. Thus, the value of factor (i) may represent the number of these entries included in the content being scored.

When all of values (a)-(i) are plugged into the above function, a numerical value will be output which represents the score of the content. As can be seen, factors (a)-(h) represent values that will negatively impact the scoring of the content. The more negative factors detected in the content, the higher the score will be. On the other hand, factor (i) represents a value which will positively impact the scoring of the content. Thus, factor (i) serves to mitigate the negative effect of factors (a)-(h) in the scoring of the content by reducing the numerical value output by the function.

Another very useful feature which may be used in conjunction with the above scoring function or other means of scoring content, is herein referred to as "fuzzy matching." Fuzzy matching can be used to determine if a particular word was intentionally or accidentally written in a specific way to avoid triggering a database match (e.g., to avoid being identified in the severe words list, 18+ filter list, etc.). For example, imagine that all messages including the word "love" are to be filtered (or at least identified) in the feed 122. Someone wishing to get a message displayed may try to get around the filter by writing the word "love" using non-conventional spellings (e.g., "L*ve", "L0ve", "Lŏve", "£ove", "Lov3", Luv, etc.).

In order to address the above issue and prevent persons from circumventing the filters, fuzzy matching can be applied. By manipulating the content using a variety of different tests, it can be determined if a particular word was intentionally or accidentally written in a specific way to avoid triggering a database match or filter. Applying fuzzy matching may involve identifying alternative representations of a word or phrase (e.g., "L*ve", "L0ve", "Lŏve", "£ove", "Lov3", Luv, etc.) by removing all characters outside of the standard A-Z and a-z character sets, removing characters which have been repeated more than twice consecutively, removing words which are phonetically identical (e.g., "dear" and "deer"), or running a character replacement match (e.g., replace "0" with "O").

Using these fuzzy matching manipulations, alternate representations can be dynamically matched against the original word (e.g., "love") stored in the database. The dynamic nature of fuzzy matching reduces the amount of iterations needed to initially store a target word or phrase, and eliminates the need to constantly add new intentional misspellings as languages and data entry methods evolve.

Figure 3:
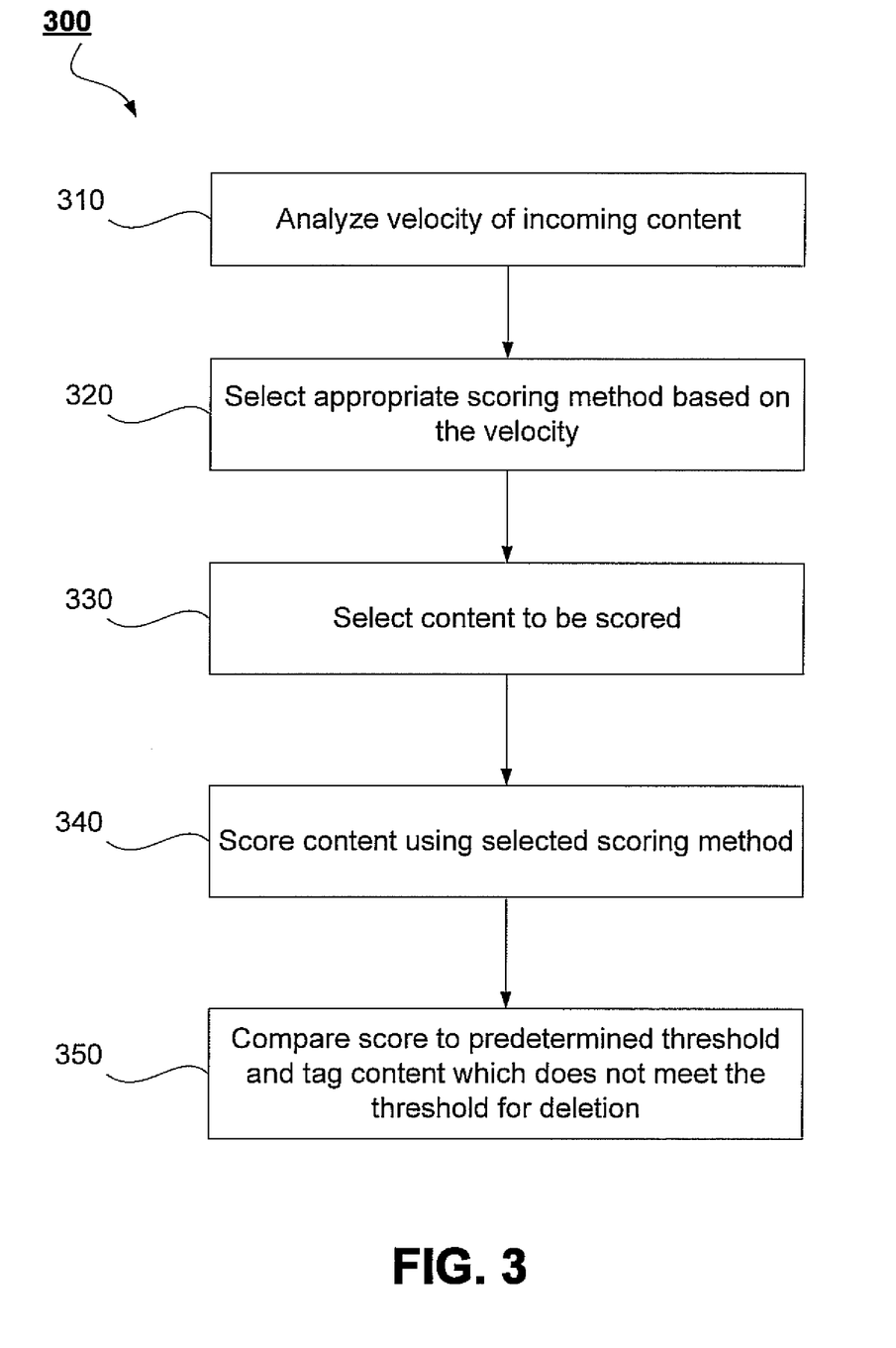
FIG. 3 is a block/flow diagram illustrating an exemplary process for implementing an auger module in accordance with one embodiment of the present principles.

Moving on to FIG. 3, an exemplary process 300 for implementing the auger module 150 in accordance with the present principles is provided. In block 310, the velocity of the incoming content is analyzed. As explained above, in certain embodiments, this may involve determining the number of messages being input to the feed 122 during a particular time interval. The velocity of the feed is used to select an appropriate scoring method in block 320. In one embodiment, this may be accomplished by comparing the velocity to a threshold value which reflects the maximum velocity or the maximum number of messages that end users can perceive during a predetermined time interval (e.g., it may be determined that a user watching a display can only read ten messages per minute).

As an example, if a relatively low velocity is detected in block 310, a "low velocity" scoring process may be selected which comprehensively scores the content in the feed 122. Alternatively, if a relatively high velocity is detected, then a "high velocity" scoring process may be selected which is less comprehensive and which allows content to be scored quickly. Moreover, it should be recognized that more than two different scoring processes may be employed (e.g., there may also be an "intermediate velocity" scoring process or several intermediate scoring processes).

After a piece of content has been selected from the bin (block 330), the content is scored using the selected scoring process in block 340. The score assigned to the piece of content is then compared to a predetermined threshold to determine whether the piece of content satisfies minimum quality standards (block 350). If the content does not satisfy minimum quality standards, the message will be marked for deletion. However, if the message does satisfy minimum quality standards, it may be available for to be rendered.

It should be noted that in certain embodiments a piece of content which satisfies the minimum quality standards may not be rendered. For example, suppose that sixty different messages in a minute make it through the scoring process 300, all of which satisfy the minimum quality standard. These messages will be stored in the bin module 140 or a separate queue and will be prioritized by transmitter module 160. If there are only six messages being rendered for display per minute, it would take ten minutes to render all sixty messages. Hence, only the best messages with the highest priority are guaranteed to be rendered, while the remaining messages could be deleted from the bin by the purge function 144. Deleting these messages may be advantageous in certain circumstances where commentary is being provided on an event in real-time. In this sense, the purge function guarantees that there are no "stale" messages left in the bin.

Figure 4:
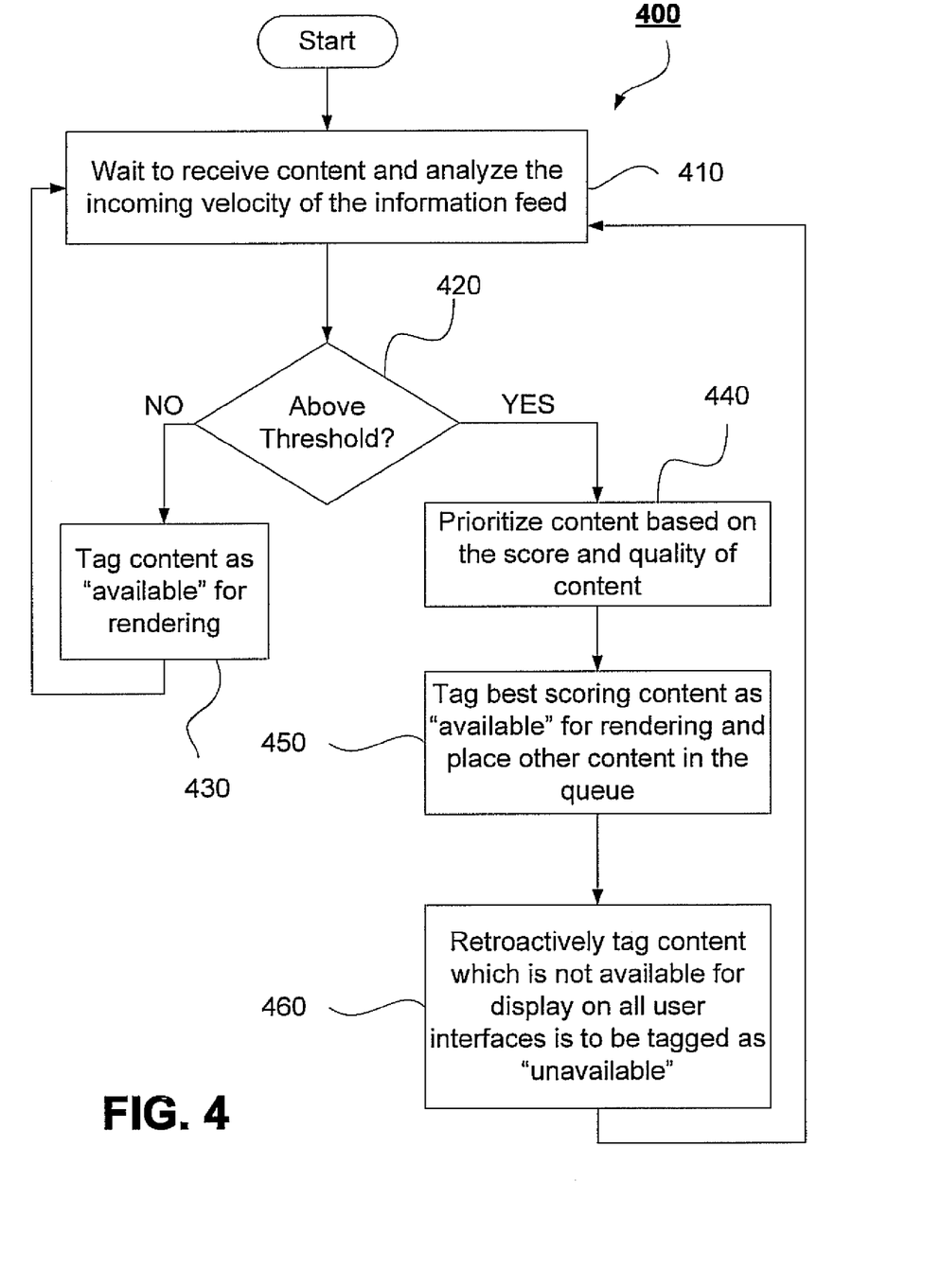
FIG. 4 is a block/flow diagram illustrating an exemplary process for implementing a transmitter module in accordance with one embodiment of the present principles.

Regarding FIG. 4, an exemplary process 400 for implementing the transmitter module 160 is shown. The method begins at the start block and proceeds to block 410 where transmitter module 160 waits for content to be received and analyzes the incoming velocity of the information. In one embodiment, this is accomplished by monitoring the amount of incoming content and/or by determining how many previously received pieces of content are currently stored in a queue (or the bin). The velocity is checked against a predetermined threshold (block 420) which may customized by a user (e.g., via a web or mobile interface).

In one embodiment, the velocity threshold is set to allow six pieces of content (e.g., text messages) to be rendered per minute, or one piece of content every 10 seconds. First suppose that there is no content in the queue waiting to be rendered and that only one piece of content is received by the transmitter module 160. In this case, the method would proceed to block 430 where that piece of content would be tagged as available for rendering. The flow would then proceed back to block 410 where more content would be awaited.

In an alternate scenario, suppose that no content is in the queue waiting to be rendered and that the transmitter module receives three messages at once. In this case, the threshold for that ten second interval is exceeded since only one message can be rendered every 10 seconds. Therefore, the method would proceed to block 440 where the content would be prioritized based on the quality of the content. This may be reflected by the score assigned to the content previously (e.g., in the auger module 150). After the content is prioritized using the scores assigned to the content, the content having the best score is tagged as "available" to be rendered (block 450). If two pieces of content have the same exact score and those scores are higher than any others, the most recent piece of content should be selected. Tagging content as available will permit the rendering module 170 to identify which content should be loaded for rendering.

Staying with the above example, the other two pieces of content which were not tagged as available would be stored in a queue. If no content was received in the next ten second time interval, the piece of content with the highest score in the queue would be selected for rendering. However, if additional content was received in the next ten second interval, the score of such content would be compared against the scores of the content in the queue to determine which piece of content is to be rendered.

In one embodiment of the transmitter module 160, messages expire quickly since the system is looking for relative and real-time content. A message would only be held in the queue for a very short period of time, typically 60 seconds or less before being deleted.

In block 460, (which is optional) content which is not available for display on all user interfaces is marked as being unavailable. This will prevent the rendering module 170 from loading these messages.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
receiving a feed which includes content from at least one data source;
selecting one of a plurality of scoring methods for scoring the content based on a velocity of the feed, wherein selecting one of a plurality of scoring methods includes comparing the velocity of the feed to a predetermined threshold value and selecting either a first scoring method if the velocity is at or below the threshold value or a second scoring method if the velocity is above the threshold value, wherein said second scoring method allows content to be scored faster than the first scoring method;
determining which content in the feed is appropriate for display by producing a score in accordance with the selected scoring method, wherein the selected scoring method uses a plurality of weighted scoring factors which alter the score based on whether the content includes objectionable material determined in accordance with user-defined criteria; and
determining whether content is to be rendered on at least one rendering device based on the score assigned to the content.

2. The method of claim 1, wherein an interface permits a user to define the scoring factors and to define weights which are assigned to the scoring factors.

3. The method of claim 1, wherein the content is comprised of text data, and fuzzy matching is employed to identify alternative, non-conventional representations of words or phrases for comparison against a conventional representation of a word or phrase by manipulating the text data with at least one of the following operations:
removing all characters outside of the standard A-Z and a-z character sets;
removing characters which have been repeated more than twice consecutively;
removing words which are phonetically identical; and
running a character replacement match.

4. The method of claim 1, further comprising conforming a plurality of data sources containing content in a plurality of different formats into a uniform format using a plurality of XML style sheets, each of which is uniquely tailored to convert a particular data source format into the uniform format.

5. The method of claim 1, wherein producing a score includes at least one of:
determining whether the content includes information with a non-conforming character set or regional encoding;
determining whether the content includes code or machine data; and
determining whether the content is age appropriate.

6. The method of claim 1, wherein the content comprises at least one of audio data, video data and image data.

7. The method of claim 1, wherein producing the score includes determining whether a piece of content includes a suspect portion which could reduce a probability that the piece of content is to be rendered depending upon a context in which the suspect portion is being used, and further determining the context in which the suspect portion is being used by searching surrounding content for a clarifying portion which helps to determine the context in which the suspect portion is being used.

8. A computer program product comprising a non-transitory computer readable storage medium having computer executable program code for implementing a network coding scheme, said computer program product when executed performs the steps as recited in claim 1.

9. The method of claim 1, wherein producing a score includes at least one of:
determining whether the content includes information with a non-conforming character set or regional encoding;
determining whether the content includes code or machine data; and
determining whether the content is age appropriate.

10. A system, comprising:
a feed combine module configured to produce a feed which includes content from at least one data source;
an auger module stored in a non-transitory computer readable storage medium and configured to select a scoring method for scoring the content in the feed based on a velocity of the feed, wherein the scoring method is selected by comparing the velocity of the feed to a predetermined threshold value and by selecting either a first scoring method if the velocity is at or below the threshold value or a second scoring method if the velocity is above the threshold value, wherein said second scoring method allows content to be scored faster than the first scoring method, and the auger module being further configured to determine which content in the feed is appropriate for display by producing a score in accordance with the selected scoring method, wherein the scoring method uses a plurality of weighted scoring factors which alter the score based on whether the content includes objectionable material determined in accordance with user-defined criteria; and
a transmitter module configured to prioritize the content to determine an order in which the content will be rendered by at least one rendering device based on the scores assigned to the content.

11. The system of claim 10, wherein an interface permits a user to define the scoring factors and to define weights which are assigned to the scoring factors.

12. The system of claim 10, wherein the content is comprised of text data, and fuzzy matching is employed to identify alternative, non-conventional representations of words or phrases for comparison against a conventional representation of a word or phrase by manipulating the text data with at least one of the following operations:
removing all characters outside of the standard A-Z and a-z character sets;
removing characters which have been repeated more than twice consecutively;
removing words which are phonetically identical; and
running a character replacement match.

13. The system of claim 10, wherein producing a score includes at least one of:
determining whether the content includes information with a non-conforming character set or regional encoding;
determining whether the content includes code or machine data; and
determining whether the content is age appropriate.

14. The system of claim 10, wherein the content comprises at least one of audio data, video data and image data.

15. The system of claim 10, wherein producing the score includes determining whether a piece of content includes a suspect portion which could reduce a probability that the piece of content is to be rendered depending upon a context in which the suspect portion is being used, and further determining the context in which the suspect portion is being used by searching surrounding content for a clarifying portion which helps to determine the context in which the suspect portion is being used.

16. A method, comprising:
receiving a feed which includes content from at least one data source;
selecting one of a plurality of scoring methods for scoring the content based on a velocity of the feed;
determining which content in the feed is appropriate for display by producing a score in accordance with a selected scoring method, wherein the selected scoring method uses a plurality of weighted scoring factors which alter the score based on whether the content includes objectionable material determined in accordance with user-defined criteria, wherein the content is comprised of text data, and fuzzy matching is employed to identify alternative, non-conventional representations of words or phrases for comparison against a conventional representation of a word or phrase by manipulating the text data with at least one of the following operations:
removing all characters outside of the standard A-Z and a-z character sets;

removing characters which have been repeated more than twice consecutively;

removing words which are phonetically identical; and running a character replacement match; and determining whether content is to be rendered on at least one rendering device based on the score assigned to the content.

17. The method of claim 16, wherein selecting one of a plurality of scoring methods includes comparing the velocity of the feed to a predetermined threshold value and selecting either a first scoring method if the velocity is at or below the threshold value or a second scoring method if the velocity is above the threshold value, wherein said second scoring method allows content to be scored faster than the first scoring method.

18. The method of claim 16, wherein an interface permits a user to define the scoring factors and to define weights which are assigned to the scoring factors.

19. The method of claim 16, further comprising conforming a plurality of data sources containing content in a plurality of different formats into a uniform format using a plurality of XML style sheets, each of which is uniquely tailored to convert a particular data source format into the uniform format.

20. The method of claim 16, wherein producing the score includes determining whether a piece of content includes a suspect portion which could reduce a probability that the piece of content is to be rendered depending upon a context in which the suspect portion is being used, and further determining the context in which the suspect portion is being used by searching surrounding content for a clarifying portion which helps to determine the context in which the suspect portion is being used.

21. A computer program product comprising a non-transitory computer readable storage medium having computer executable program code for implementing a network coding scheme, said computer program product when executed performs the steps as recited in claim 16.

* * * * *